Sept. 2, 1952 E. J. SCHMIDT 2,608,936
GENERATOR DRIVE FOR RAILWAY VEHICLES
Filed Oct. 12, 1946 3 Sheets-Sheet 3

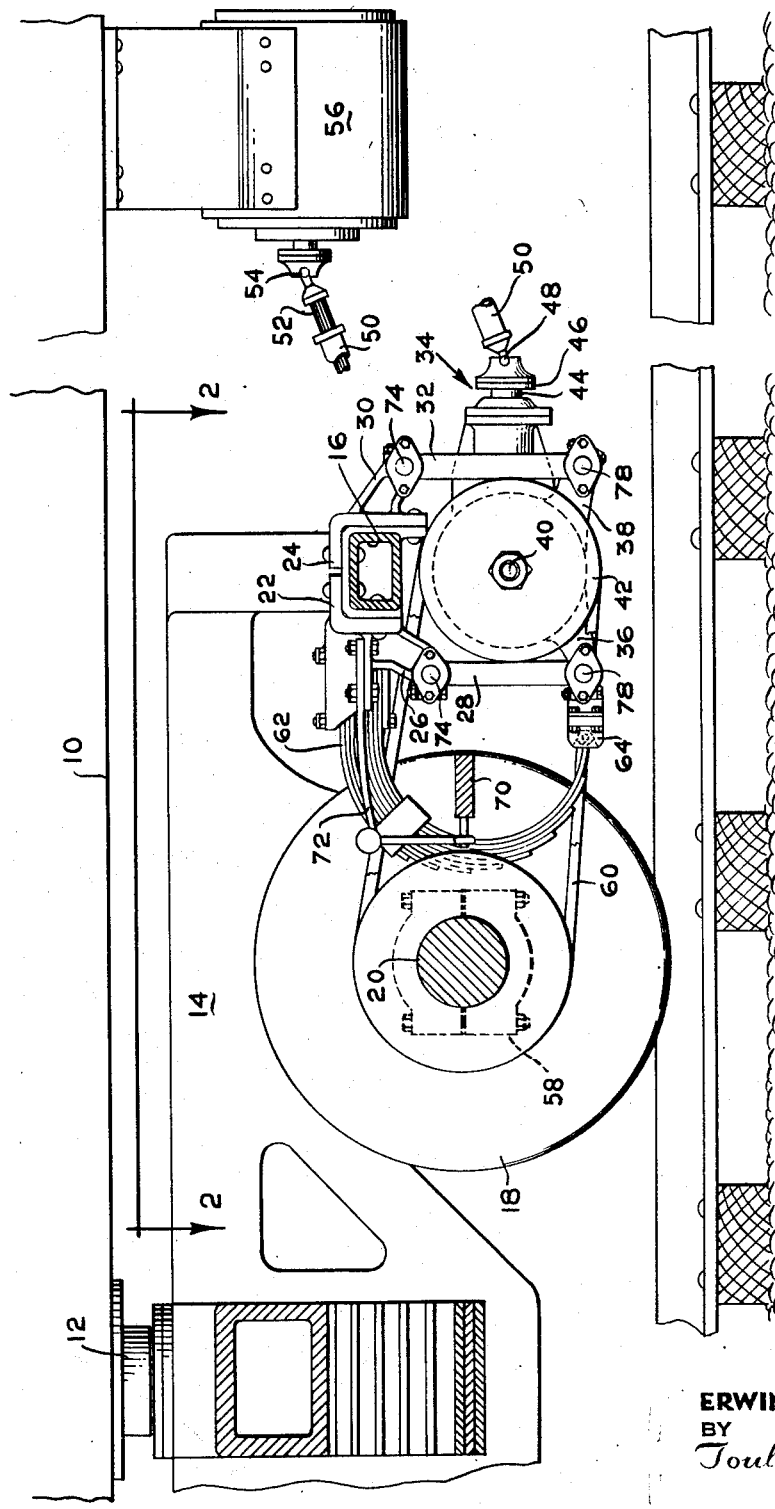

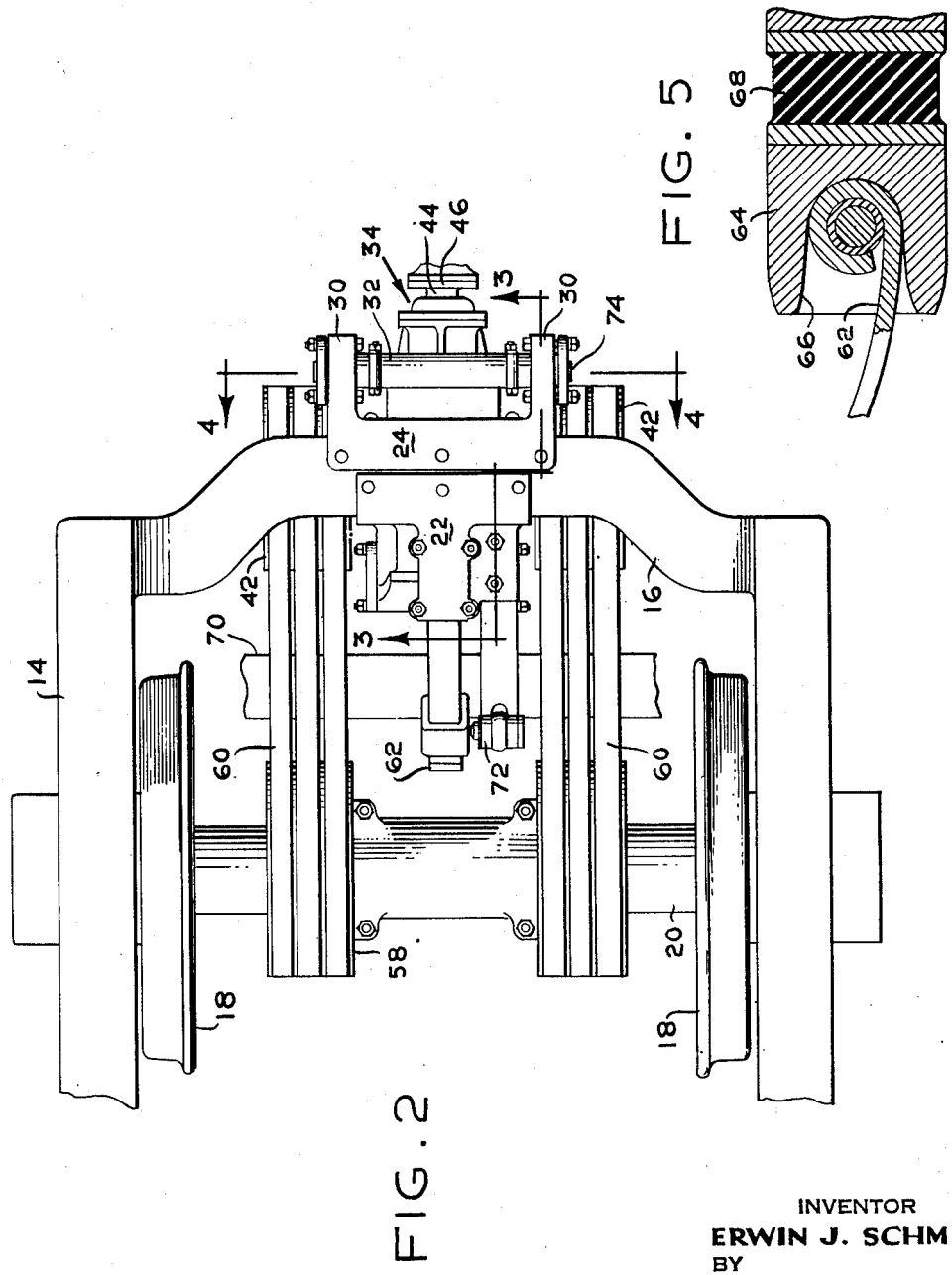

INVENTOR
ERWIN J. SCHMIDT
BY
Toulmin & Toulmin
ATTORNEYS

Patented Sept. 2, 1952

2,608,936

UNITED STATES PATENT OFFICE 2,608,936

GENERATOR DRIVE FOR RAILWAY VEHICLES

Erwin J. Schmidt, Dayton, Ohio, assignor to The Dayton Rubber Company, a corporation of Ohio Application October 12, 1946, Serial No. 702,977

2 Claims. (Cl. 105—106)

This invention relates to generator drives for railway vehicles and the like.

Railway vehicles such as passenger coaches are provided with generators, compressors and other devices which are driven from the wheel axles in order to supply electrical energy for lighting the vehicles, for operating the air conditioning systems, and other electrical auxiliaries.

The size of such generators has been increasing progressively until at the present time there are required generators from 25 to 40 kilowatts capacity for each car. The driving of such a generator requires that a substantial amount of power be transmitted from the car wheel axle to the input shaft of the generator. Due to the grit, moisture, and other foreign matter, to rapidly changing weather conditions and other factors, it is impractical to employ a driving means such as an unenclosed chain or gear train between the wheel axle and the generator and it has been found that V-belts of rubber-like material suitably reinforced with cords, fabric, metal wires or cables or a combination thereof are a more satisfactory driving medium because of greater resistance to these influences. Furthermore, the belts are more yielding and thus provide a flexible drive and also function as a safety feature during an emergency.

When V-belt drives are employed, it is necessary that a plurality thereof be used in order to transmit sufficient power. The number of belts required in any installation is substantially increased if the belts are of the open type with their ends secured together by a belt connector, and because of space limitations, there is a limit to the number of belts which can be used. For instance, eight belts with connectors can drive a 30 kilowatt generator. However, only six belts can be used because of the space available thereby dividing the total load by six instead of eight. The tension per belt is increased thereby overburdening the connector joint to the point of failure. Endless belts can withstand the higher necessary tension and their use is to be desired.

In order to insure full transmission of power from the wheel axle, the belt must make a large area of contact therewith thereby requiring that the belt pass around the wheel axle and be engaged by a pulley or sheave carried thereon.

Accordingly, it is a primary object of the present invention to provide an improved generator drive for a railway vehicle wherein endless V-belts may be employed.

It is still another object to provide an endless V-belt drive for railway vehicle generators whereby the largest possible area of contact between the belt and the wheel axle pulleys is obtained.

A still further object is the provision of an endless V-belt generator drive for a railway vehicle in which substantially all bending or torsional stresses are eliminated.

It is also an object to provide an endless type V-belt drive for a railway vehicle generator in which the belt tension is maintained substantially uniform at all times.

Still another object is the provision of a railway vehicle generator drive in which sliding journals are substantially eliminated.

These and other objects and advantages will become more apparent upon reference to the following description taken in connection with the attached drawings in which:

Figure 1 is a vertical section through a portion of a railway vehicle showing the generator and drive thereto from the wheel axle;

Figure 2 is a plan view indicated by the line 2—2 on Figure 1;

Figure 5 is a somewhat enlarged view showing the flexible anchor for the spring which maintains the belt tension.

General arrangement

Figure 4:
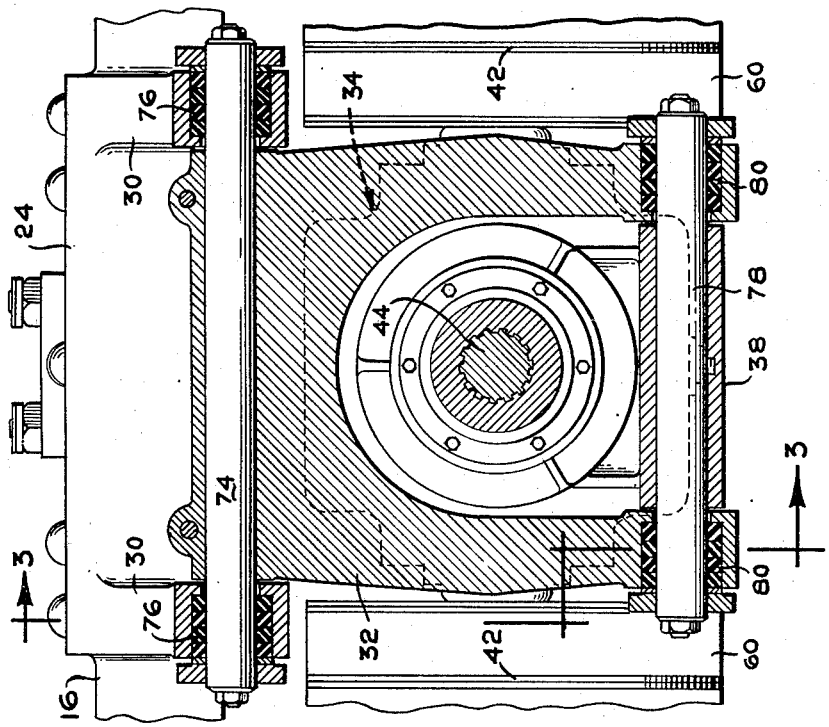
Figure 4 is a vertical section indicated by the line 4—4 in Figure 2 and showing other details in connection with the generator drive.

According to this invention, the railway vehicle generator is rigidly mounted on the under side of the frame thereof. On the pivoted truck of the vehicle there is carried a geared transmission unit which is connected with the generator drive shaft by a flexible connection such as a splined shaft and a pair of universal joints. This permits pivoting movement of the truck on the vehicle frame without affecting the generator drive. The geared transmission is preferably suspended directly beneath one sill of the car truck and is suspended from spaced points so that substantially all torsional and bending stresses on the sill are eliminated. Preferably, the transmission is movable relative to the sill for maintaining proper tension in the belts; and to eliminate the conventional type of journals, there are preferably employed resilient rubber-like mountings for the said transmission. This eliminates all abrasion and wear at the several pivot points of the transmission suspension.

The transmission includes drive pulleys around which pass endless V-belts which also pass around pulleys or sheaves carried on the wheel axle. The spacing of the transmission from the wheel is such that the length of the belts are great enough that they can be passed over the wheel and therefore do not need to be cut and joined together by connectors.

That an arrangement of this nature is practical will be evident from the fact that normally the car wheels are removed from the vehicle about every 60,000 miles of travel to be turned down to have a smooth periphery while endless belts of the nature employed herein have a service life of from 250,000 to 300,000 working miles and upwardly. It will be apparent that it would be simple to maintain the belts in good condition, and that if one or more thereof were to be worn out or broken before the wheels of the vehicle were removed for burning, it would be possible to replace the said belt by one having a connector therein as a temporary measure.

Structural arrangement

Referring to the drawings, there is shown a vehicle frame at 10 which has pivoted as at 12 a wheel truck 14. The wheel truck comprises side portions extending substantially longitudinally of the vehicle and transverse sill portions one of which is indicated at 16. The wheel and axle assembly, indicated at 18 and 20 is journalled in the side portions of the trucks and may be suitably sprung therein or therewith as desired.

Carried on the sill 16, substantially midway between the side portions of the truck are a pair of brackets 22 and 24. The bracket 22 comprises a projecting portion at 26 which pivotally supports an arm or hanger 28. Similarly, the bracket 24 comprises the projecting portions 30 on which are pivoted an arm or hanger 32. Carried between the hangers 28 and 32 is a geared transmission generally indicated at 34 and which comprises the projections 36 and 38 to which are pivoted, respectively, the lower ends of the hangers 28 and 32.

The geared transmission unit 34 comprises no part of the present invention except as to its function and it comprises a transverse shaft 40 on each end of which are carried a plurality of V-pulleys 42.

The transverse shaft 40 drives through suitable gearing, such as bevel gears, into an output shaft 44 extending outwardly from the geared unit and having a mounting flange 46. Secured to the mounting flange 46 is one member of a universal joint 48 which drives into a splined sleeve 50. The splined sleeve is engaged by a splined shaft 52 which connects through a second universal joint 54 with the input shaft of the vehicle generator 56. It will be apparent that pivoting movement of the truck 14 about its pivot 12, and the springing movements thereof will in no way affect the drive from the output shaft 44 of the transmission to the generator 56.

Secured to the axle 20 are the split sheaves 58 which are arranged in alignment with the pulleys 42 of the transmission. Preferably, as best seen in Figure 2, the split sheaves on the axle 20 are an integral unit with the connecting portion thereof extending therebetween. Passing around the sheaves 58 and the pulleys 42 are a plurality of endless V-belts 60 which, as will be seen in the drawings, are of sufficient length to be passed over the wheels 18 when the wheels and axle are being assembled in the truck.

For maintaining the belts under a predetermined tension at all times, there is a leaf spring indicated at 62 which has one end anchored on the bracket 22 and the other end anchored in a block 64 as best seen in Figure 5. The end of the spring 62 is arcuate and bears in an arcuate recess 66 in the said block so that there is no torsional resistance to movement of the spring and block. The block 64 is preferably carried on the casing of the transmission by means of the rubber-like connector 68 which permits floating movements of the block 64 and thereby promotes the efficient tensioning by the belts of the spring 62.

The leaf spring 62 is arcuate in configuration for the best results and also provides a space for receiving a brake beam or rod 70 which extends between the wheel brakes of the vehicle. Optionally, the brake rod 70 may be yieldably supported by a leaf spring 72 known as a brake beam balance hanger also carried on the bracket 22.

Figure 3:
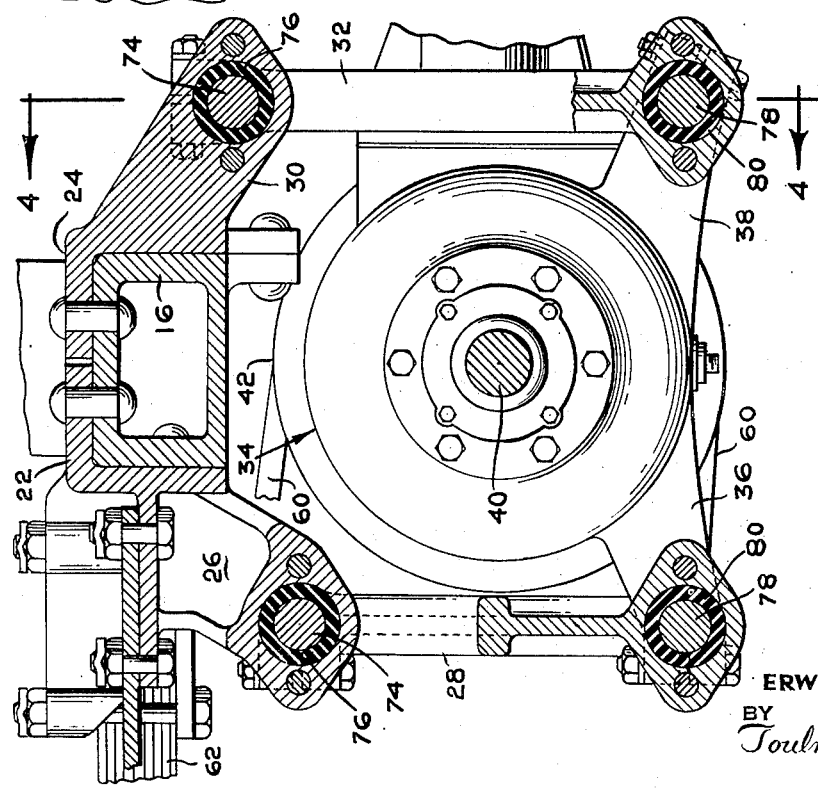
Figure 3 is a vertical section indicated by the line 3—3 on Figure 2 and showing a portion of the generator drive.

The suspension for the geared transmission may best be seen in Figures 3 and 4 wherein it will be noted that the pivot pins 74, by means of which the hangers 28 and 32 are suspended from the brackets 22 and 24, are encircled by rubber-like members 76. In Figure 4, it will be seen that rubber-like members 76 comprise a plurality of discs or washers which are compressed and which serve as yielding means to permit movement of the transmission by the spring 62. The transmission is in turn supported on the lower ends of the hangers 28 and 30 by the pins 78 which are similarly provided with the resilient rubber-like means 80 therearound.

In the foregoing, it will be seen that the generator drive according to this invention offers certain definite advantages. Among these are, endless belt driving means all of which have large area in contact with the driving and driven pulleys, a substantially torsional free support for the geared transmission unit, continuous tensioning means for the drive belts, and a flexible driving connection between the transmission unit and the generator.

It will be understood that this invention is susceptible to modification in order to adopt it to different usages and conditions and, accordingly, it is desired to comprehend such modifications within this invention as may fall within the scope of the appended claims.

I claim:

1. In a vehicle generator drive, said vehicle having a truck with wheels and a wheel axle; a transverse sill on said truck substantially parallel with said axle; a bracket secured to said sill and extending downwardly thereof; a transmission unit resiliently suspended on said bracket and centered beneath said sill for movements substantially at right angles to the axis of said axle; spaced pulley means on said axle and the input shaft of said transmission on opposite sides thereof and endless belts passing therearound for supplying power to said transmission; an arcuate leaf spring one end of which is anchored on said bracket said spring curving downwardly between the wheel axle and the transmission unit with the opposite end in engagement with a block on said transmission unit continuously urging said unit away from said axle and maintaining the belts in a taut condition.

2. A vehicle generator drive according to claim 1 wherein the block on the transmission unit which is engaged by the opposite end of the leaf spring is resiliently mounted on the transmission unit.

ERWIN J. SCHMIDT.

REFERENCES CITED

The following references are of record in the file of this patent:

UNITED STATES PATENTS

| Number | Name | Date |
|---|---|---|
| 1,454,035 | Bouche | May 8, 1923 |
| 1,714,092 | Johnson | May 21, 1929 |
| 1,786,401 | Pitt | Dec. 23, 1930 |
| 1,987,753 | Schmidt | Jan. 15, 1935 |
| 2,053,983 | Whitsitt | Sept. 8, 1936 |
| 2,077,642 | Powell | Apr. 20, 1937 |
| 2,204,281 | Nystrom | June 11, 1940 |
| 2,226,887 | Wood | Dec. 31, 1940 |

FOREIGN PATENTS

| Number | Country | Date |
|---|---|---|
| 417,804 | Germany | Aug. 20, 1925 |